April 13, 1965 W. H. GOODING 3,178,009
GATE STRUCTURE
Original Filed May 29, 1959 2 Sheets-Sheet 1
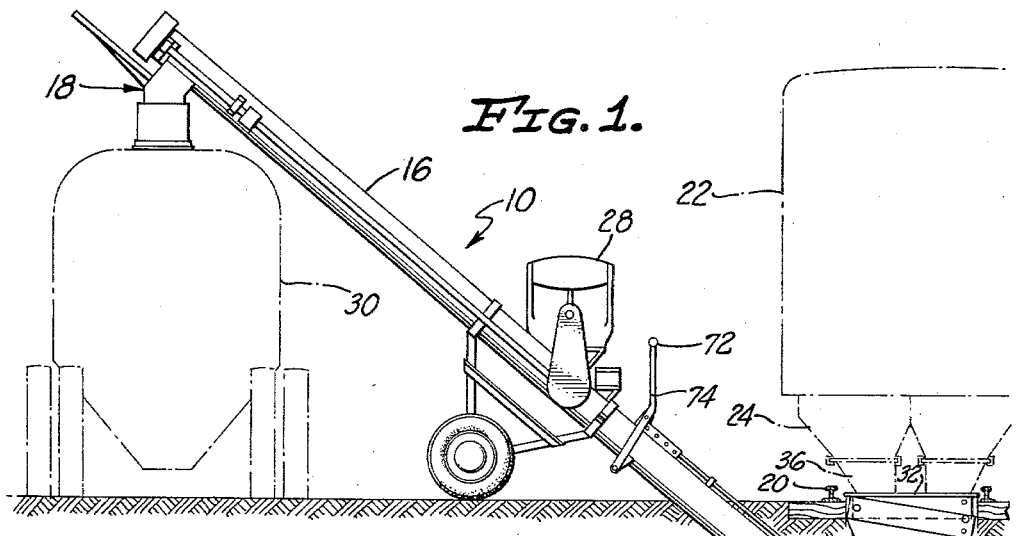
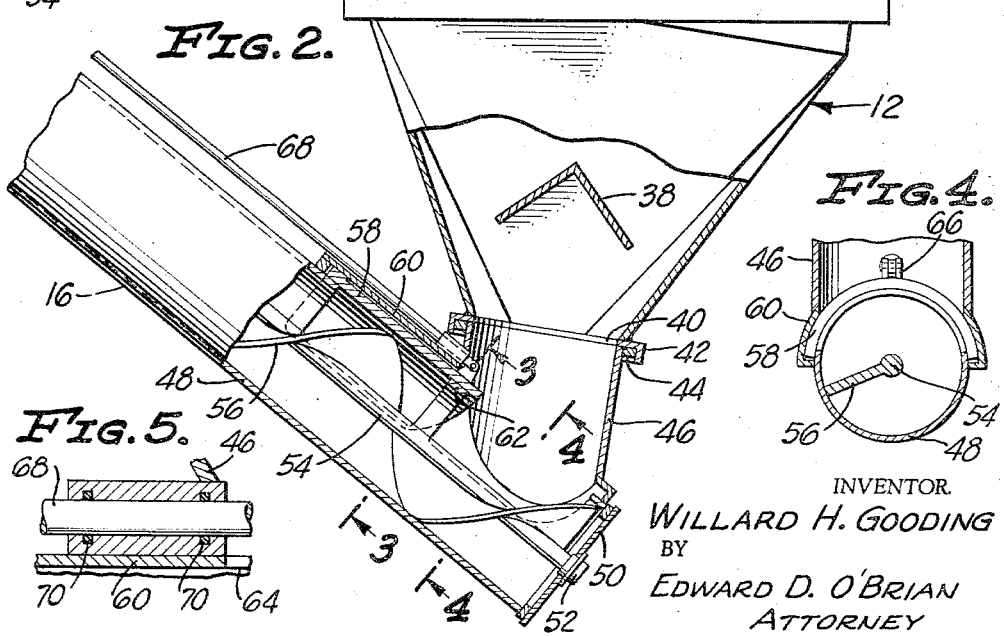
INVENTOR.
WILLARD H. GOODING
BY
EDWARD D. O'BRIAN
ATTORNEY April 13, 1965   W. H. GOODING   3,178,009
GATE STRUCTURE
Original Filed May 29, 1959   2 Sheets-Sheet 2
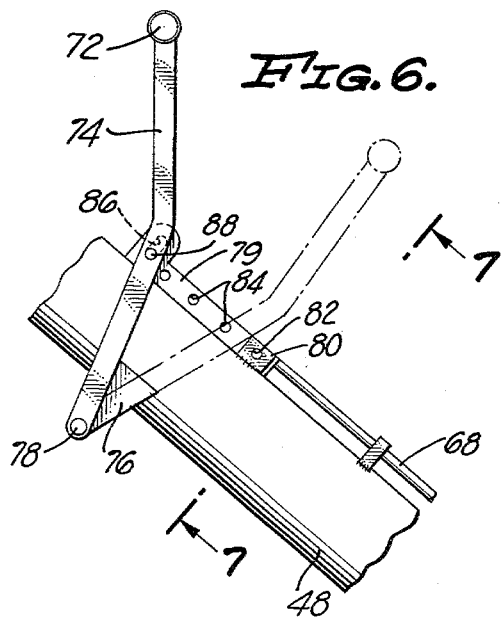
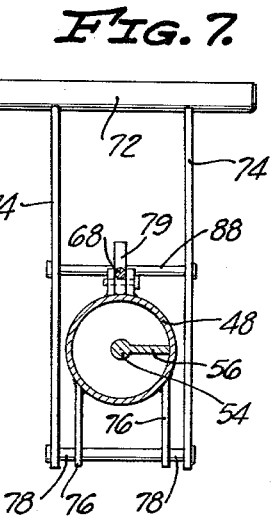
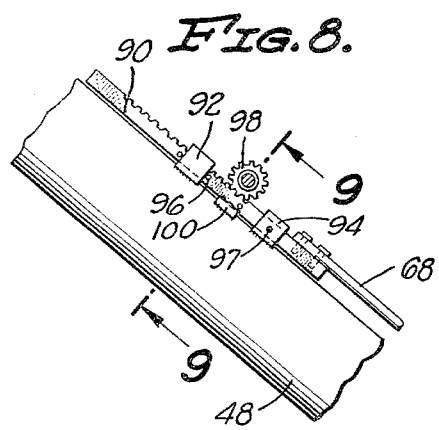
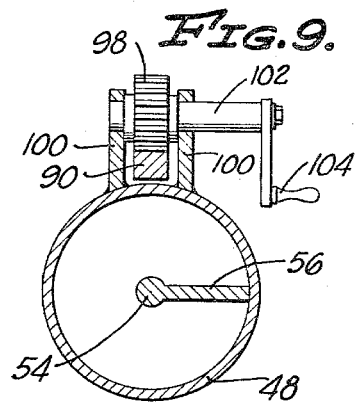
INVENTOR.
WILLARD H. GOODING.
BY
EDWARD D. O'BRIAN
ATTORNEY

United States Patent Office 3,178,009
Patented Apr. 13, 1965

3,178,009
GATE STRUCTURE
Willard H. Gooding, Los Angeles, Calif., assignor to Western Velo & Cement Specialties Company, Los Angeles, Calif., a corporation of California
Original application May 29, 1959, Ser. No. 816,921, now Patent No. 3,085,674, dated Apr. 16, 1963. Divided and this application Feb. 13, 1963, Ser. No. 258,205
7 Claims. (Cl. 198—64)

This invention pertains to new and improved unloading structure or unloaders which are primarily intended to be used with granular material such as sand, cement and the like.

This invention is more particularly directed to the inlet structure between a hopper supplying a conveyor and the conveyor itself. Inlet gate means are provided to control the flow from the hopper to the conveyor.

The cost of transporting such materials from one location to another is a very important commercial factor at the present time. In general it is preferred to ship such bulk materials by rail for economic reasons. However, several factors effectively limit the use of rail transportation in the bulk movement of such commodities.

One of these factors is the availability of railroad tracks leading to the desired locations. This factor, however, is not so important as the location of suitable unloading facilities where such materials can be unloaded to another vehicle for transportation to the point of use. The location of unloading facilities is limited by several factors. First is the fact that presently known facilities are quite large and expensive. Accordingly, only limited number may be installed in a given commercial area. A second factor is the consideration that such bulk materials as cement give off a considerable amount of dust when unloaded without suitable dust control measures. Without this control such facilities as are presently used have necessarily been limited in their location by zoning and air pollution situations.

The limited number of transfer facilities caused by these factors have increased the price of cement to the consumer for the greater capital cost and the longer truck haulage of cement has put more cost into this basic material when it arrives at the job site.

A broad object of this invention is to provide new and improved unloading structures or unloaders. Such unloaders are comparatively inexpensive, reliable and effective so that they may be used to transfer bulk shipments from railroad to trucks more conveniently at a greater number of locations than have previously been available. A further important object is to provide unloaders which are desirable from the dust standpoint. Conservation of dust improves transfer efficiency as well as virtually eliminates air pollution.

It is a further more specific object to provide an unloading structure which is capable of careful control so that the truck being loaded can be filled to capacity without overloading.

Further objects of this invention will become apparent upon reading the appended specification, claims, and the accompanying drawings, in which:

FIG. 1 is a side elevational view of an unloader structure incorporating this invention;

FIG. 2 is a vertical section, partially broken away, of the hopper and lower section of the conveyor shown in FIG. 1;

FIG. 3 is a section taken along the line 3—3 of FIG. 2;
FIG. 4 is a section taken along the line 4—4 of FIG. 2;
FIG. 5 is a detail of a portion of the structure shown in FIG. 2;
FIG. 6 is another detail of a portion of the structure shown in FIG. 1;
FIG. 7 is a section taken along the line 7—7 of FIG. 6;
FIG. 8 is a detailed view of an alternative structure to that shown in FIG. 6, and
FIG. 9 is a section taken along the line 9—9 of FIG. 8.

The accompanying drawings are primarily intended to clearly illustrate the presently preferred embodiment of this invention. Those skilled in the art to which this invention pertains will realize that a number of modifications can be made, within the scope of routine engineering, which lie within the scope of this invention.

Referring now to the drawing, FIG. 1 shows the general environment of this invention. An unloader 10 includes the hopper 12, an inlet gate structure 14 arranged to control the flow of material from hopper 12 to a flight conveyor 16, and a discharge structure 18. The hopper 12 is located between the rails 20 of suitably located railroad track. The railroad car 22 designed for bulk service of such commodities of cement is located on the railroad track 20. Discharge openings 24 discharge the commodity through flexible connectors 36 to the hopper 12.

The commodity, generally any granular material such as sand, cement and the like, is controlled in its flow from the hopper 12 by means of the inlet gate 14. After passing the gate structure it enters the flight conveyor 16 which is powered by a suitable prime mover such as engine 28. Thence the material passes through the discharge structure 18 into another receptacle such as truck 30.

In actual practice the unloader structure could convey materials from any source to any receptacle. However, this conveyor structure is particularly designed to convey cement from a railroad car to a truck. However it is clear that even though it is so particularly designed, it is suitable for other applications.

Referring now more particularly to FIG. 2, a plate 32 is arranged to be located in between the railroad tracks by the simple expedient of removing or cutting off one tie, and excavating beneath the track. Plate 32 has openings on its top corresponding to the discharge openings 24 in railroad car 22. These openings are identified by numeral 34. To provide a suitable water resistant and dust resistant connection between the openings 34 and car 22, flexible chutes such as the one indicated at 36 are coupled therebetween. Downward flow of material through the chutes 36 and through openings 34 permits the commodity to enter hopper 12. This hopper contains an inverted V shaped baffle 38 which prevents the commodity from packing around the discharge opening 40 in the hopper 12. The lower portion of hopper 12 is provided with annular flange 42 which embraces and mates with a ring 44 on the top of inlet conduit 46 secured to the flight conveyor 16. The flight conveyor is contained within a cylindrical outer shell 48 to which the inlet conduit 46 is secured. The joint between the hopper and the conveyor is such that the hopper may be angularly rotated with respect to the conveyor for flexibility in operation.

The lower end of the cylindrical outer conveyor shell 48 is provided with an end cover 50. The cover 50 carries a bearing 52 which supports the central shaft 54 which in turn carries the screw flight 56. The shaft 54 and screw flight 56 are powered from the upper end by prime mover 28. The screw flight 56 serves to convey the material through the conveyor shell 48 from the inlet conduit 46 to the discharge structure 18. In order to regulate the amount of material conveyed in this manner, or the rate at which such material enters the conveyor flight, it is an object of this invention to place within the conveyor structure 16 an inlet gate 58. The inlet gate has a curved shaped corresponding to the exterior of the barrel 48.

The inlet gate 58 is contained within housing 60 which conforms to the outer shape of the gate 58. The housing 60 is of such configuration as to permit the gate 58 to be axially movable of the conveyor 16 to permit the gate 58 to close, partially open, or completely open the passage-way from inlet conduit 46 to the interior of the cylindrical outer shell 48 of the conveyor 16.

Gate 58, when open, is held within a housing 60 of a shape corresponding to the shape of the barrel 48, which housing 60 is secured to the barrel 48 adjacent to the inlet conduit 46. As is best seen in FIG. 2 of the drawing the interior of the housing 60 is open to the interior of the barrel 48 in order to prevent material from "hanging up" within the interior of it so as to interfere with the movement of gate 58. This gate is normally supported by means of a small strap 62 curved so as to fit around the screw flight 56. As is best seen in FIGS. 2 and 3 of the drawing this strap 62 is located adjacent to one side of the inlet conduit 46.

As best seen in FIG. 3, a slot 64 is provided in the housing 60. A bracket 66 extends out of slot 64 and the control shaft 68 is secured thereto for control of the gate 58. As best seen in FIG. 5, the shaft 68 passes into the interior of the structure through packing gland or seal 70 which prevents moisture from entering into the interior of the unloader.

Control of gate 58 is thus accomplished through control shaft 68. As seen in FIGS. 6 and 7 the control shaft is operated by a handle 72. The handle 72 is carried upon the levers 74 which are mounted upon the cylindrical outer shell 48 by means of brackets 76. By operation of the handle 72, the levers 74 rotate on pivots 78.

An extension 79 is secured on the end of control shaft 68. The extension passes through a guide 80 having a hole 82 therethrough. Holes 84 in the extension 79 correspond to the hole 82. Accordingly the shaft 68 may be locked in position by passing a bolt or pin through both the guide and extension. The extension 79 contains a slotted hole 86 and pin 88 passes through levers 74 and through the slotted hole 86. Thus by motion of the handle 72, the pin works in the slotted hole 86 to longitudinally move the control shaft 68. This effectively controls the opening provided by inlet gate 58.

In the alternate of construction of FIGS. 8 and 9 the control shaft 68 is provided with extension in the form of a rack 90. The rack is guided in guides 92 and 94. The rack is provided with holes 96 and guide 94 is provided with a corresponding hole 97 so that a pin may be placed through both the rack and guide 94 for securing the rack in a particular position. Supported adjacent the rack and in engagement therewith is a pinion 98. Brackets 100 secured to the cylindrical outer shell 48 of the conveyor carries pinion shaft 102 which supports the pinion 98 and carries crank 104. Turning crank 104 turns pinion 98 which in turn moves rack 90 and control shaft 68 longitudinally, axially of the conveyor cylindrical outer shell 48. This in turn controls the position of the inlet gates 58 with respect to the opening between the inlet conduit 46 and the shell 48 of the flight conveyor. Both the structures of FIG. 6 and FIG. 8 thus control the ingress of material from hopper 12 into the flight conveyor 16.

Another important feature of the inlet gate structure is that the configuration of the gate is such that when it is closed the flight conveyor can substantially empty any material within the cylindrical outer shell 48. This is particularly important in the practice of unloading cement where hygroscopic moisture in the cement is capable of caking the cement and hardening it within the cylindrical outer shell 48. When the inlet gate 58 is closed and the screw flight is operated the flight conveyor 56 substantially cleans the shell 48 thereby preventing the flight 56 from being locked in the shell by means of hardening cement.

This application is a division of my Patent No. 3,085,674 granted April 16, 1963. The disclosure of that patent is incorporated herein in its entirety by this reference.

Having particularly described the preferred embodiment of this invention, it is apparent to those skilled in the art that it is susceptible to numerous variations and modifications. Accordingly it is intended that the scope of this invention be defined by the appended claims.

I claim:

1. In a screw conveyor having an elongated cylindrical barrel, an opening leading into an end of said barrel, an inlet conduit leading into said opening, and a screw flight fitting closely within the interior of said barrel, said screw flight extending past said opening, an improvement which comprises:

a housing secured to the exterior of said barrel adjacent to said opening and said inlet conduit, said housing having a shape corresponding to the shape of said barrel and spaced therefrom and being open to the interior of said barrel, said inlet conduit being attached to said housing;

an inlet gate having a curved shape corresponding to the shape of said barrel located within said space between said barrel and said housing, said gate being capable of being lineally moved so as to close off said opening; and means for lineally moving said inlet gate from an open position within said housing to a closed position in which said opening is closed.

2. An apparatus as defined in claim 1 wherein said means for moving said gate includes:

a packing gland secured to said inlet conduit adjacent to said inlet gate;

a rod having an axis extending through said packing gland, said rod extending along said inlet gate and being attached to the extremity of said gate closely adjacent to the portion of said inlet conduit furthest removed from said housing; and means for axially moving said rod so as to cause movement of said inlet gate.

3. An apparatus as defined in claim 1 wherein said inlet gate is movable parallel to the axis of said barrel.

4. In a conveyor having an elongated outer shell cylindrical, an opening leading into an end of said shell, an inlet conduit leading into said opening, screw conveyor means within the interior of said shell and embraced by said shell, said conveyor means extending past said opening, the improvement which comprises:

a housing secured to the shell adjacent to said opening in said inlet conduit, said housing being spaced from said shell and having an arcuate shape corresponding to the shape of said shell and being open to the interior of said shell, said housing being substantially longer in the axial direction of said shell than said opening, said inlet conduit being attached to said housing;

an inlet gate having an arcuate shape corresponding to the shape of said shell located in said space between said housing and said shell and adjacent to said conveyor, said gate being capable of being lineally moved so as to move in said housing over said opening so as to close off said opening; and means for lineally moving said inlet gate from a position wherein it closes said opening to a position wherein it exposes said opening.

5. The structure of claim 4 wherein manually operable means is connected to said gate to control the relationship of said gate with respect to said opening.

6. The structure of claim 5 wherein said manually operable means includes a control shaft passing through a sealing gland and connected to said inlet gate.

7. The structure of claim 6 wherein said manually operable means is arranged for locking in one of a plurality of selectable positions.

References Cited in the file of this patent

UNITED STATES PATENTS

| | | |
|---|---|---|
| 1,807,845 | Hunt | June 2, 1931 |
| 2,055,725 | Johnson | Sept. 29, 1936 |

FOREIGN PATENTS

| | | |
|---|---|---|
| 465,906 | Canada | June 13, 1950 |